(12) United States Patent
Allen et al.

(10) Patent No.: US 10,857,814 B2
(45) Date of Patent: Dec. 8, 2020

(54) DIRECT-TO-TEXTILE PRINTING METHOD AND SYSTEM

(71) Applicant: DIRECT COLOR, INC., Rocky Hill, CT (US)

(72) Inventors: Blair Andrew Allen, Cromwell, CT (US); William George Allen, Kensington, CT (US); Matthew Roth Sands, Glastonbury, CT (US); Steven Glenn Bedford, Grandville, MA (US); Michael Del Sesto, Unionville, CT (US)

(73) Assignee: DIRECT COLOR, INC., Rocky Hill, CT (US)

( * ) Notice: Subject to any disclaimer, the term of this patent is extended or adjusted under 35 U.S.C. 154(b) by 0 days.

(21) Appl. No.: 16/331,522

(22) PCT Filed: Sep. 11, 2017

(86) PCT No.: PCT/US2017/050963
§ 371 (c)(1),
(2) Date: Mar. 7, 2019

(87) PCT Pub. No.: WO2018/049327
PCT Pub. Date: Mar. 15, 2018

(65) Prior Publication Data
US 2019/0202214 A1    Jul. 4, 2019

Related U.S. Application Data

(60) Provisional application No. 62/393,475, filed on Sep. 12, 2016.

(51) Int. Cl.
*B41J 3/407* (2006.01)
*B41J 11/00* (2006.01)
(Continued)

(52) U.S. Cl.
CPC .......... *B41J 3/4078* (2013.01); *B41J 11/002* (2013.01); *C09D 11/101* (2013.01); *D06P 5/002* (2013.01);
(Continued)

(58) Field of Classification Search
CPC .......... B41J 11/002; B41J 3/4078; B41J 2/01; B41M 7/0081; B41M 7/00; B41M 5/0047; D06P 5/30
See application file for complete search history.

(56) References Cited

U.S. PATENT DOCUMENTS 6,513,924 B1 * 2/2003 Goldberg ............... B41J 3/4078
347/102
7,506,974 B2 * 3/2009 Hirakawa .................. B41J 2/04
347/101
(Continued)

FOREIGN PATENT DOCUMENTS

CN    1511897 A    7/2004
CN    1572492 A    2/2005
(Continued)

OTHER PUBLICATIONS

International Search Report and Written Opinion dated Dec. 20, 2017, for corresponding PCT Application No. PCT/US2017/050963.
(Continued)

*Primary Examiner* — John Zimmermann
(74) *Attorney, Agent, or Firm* — Kinney & Lange, P.A.

(57) ABSTRACT

A method of printing UV-curable ink with a direct-to-textile digital printing system onto a textile includes positioning the textile in the direct-to-textile printing system, applying UV-curable ink to the textile with the direct-to-textile print-
(Continued)

ing system according to a digital design file; and at least partially curing the UV-curable ink applied to the textile with UV light.

16 Claims, 7 Drawing Sheets

(51) Int. Cl.
  *C09D 11/101* (2014.01)
  *D06P 5/30* (2006.01)
  *D06P 5/00* (2006.01)
  *D06P 5/20* (2006.01)
(52) U.S. Cl.
  CPC .......... *D06P 5/2005* (2013.01); *D06P 5/2077* (2013.01); *D06P 5/30* (2013.01)

(56) References Cited

U.S. PATENT DOCUMENTS

| | | | |
|---|---|---|---|
| 7,594,722 B2 * | 9/2009 | Kadomatsu | B41J 2/2114 |
| | | | 347/105 |
| 7,661,807 B2 * | 2/2010 | Nakano | B41J 11/002 |
| | | | 347/102 |
| 2001/0038408 A1 | 11/2001 | Codos et al. | |
| 2002/0005870 A1 | 1/2002 | Codos et al. | |
| 2004/0100512 A1 * | 5/2004 | Codos | B41J 2/01 |
| | | | 347/8 |
| 2004/0189772 A1 * | 9/2004 | Arai | B41J 3/543 |
| | | | 347/102 |
| 2004/0252173 A1 | 12/2004 | Ben-Zur et al. | |
| 2005/0190248 A1 * | 9/2005 | Konno | B41J 2/155 |
| | | | 347/102 |
| 2007/0024686 A1 * | 2/2007 | Kadomatsu | B41J 2/15 |
| | | | 347/102 |
| 2008/0169452 A1 | 7/2008 | Schneider et al. | |
| 2011/0169901 A1 * | 7/2011 | Pinto | D06P 1/54 |
| | | | 347/101 |
| 2012/0287213 A1 | 11/2012 | Engel et al. | |
| 2013/0113868 A1 | 5/2013 | Veis | |
| 2013/0278692 A1 | 10/2013 | Marino et al. | |
| 2016/0207306 A1 * | 7/2016 | Landa | B41J 2/0057 |
| 2017/0233595 A1 * | 8/2017 | Erdodi | C09D 11/037 |
| | | | 428/201 |

FOREIGN PATENT DOCUMENTS

| | | |
|---|---|---|
| CN | 1764754 A | 4/2006 |
| CN | 104512139 A | 4/2015 |
| KR | 10-1002452 B1 | 12/2010 |
| KR | 10-2014-0040747 A | 4/2014 |
| WO | 2015094564 A1 | 6/2015 |

OTHER PUBLICATIONS

International Preliminary Report on Patentability dated Mar. 21, 2019, received for corresponding PCT Application No. PCT/US2017/050963.
Supplementary Extended European Search report dated Mar. 12, 2020 received for corresponding European Application No. 17849721.0, 7 pages.
First Chinese Office Action dated Apr. 24, 2020, for corresponding Chinese Application No. 201780056113.5.

* cited by examiner

DIRECT-TO-TEXTILE PRINTING METHOD AND SYSTEM

BACKGROUND

The present invention relates to the technical field of digital textile printing such as garment and/or fabric printing, and in particular to direct-to-textile printing such as direct-to-garment and/or fabric printing using UV-curable ink.

Digitally printing graphic designs and other decorative features on textiles such as garments and fabric is very popular, and machines and processes have been developed that print these features directly onto the fabric of a garment, without the necessity of a separate transfer process. These machines and processes use a specialized inkjet technology, and include a system for locating a print head with respect to the garment being printed and special inkjet textile ink that is applied directly to the garment and is absorbed by the fibers of the garment fabric. The inkjet textile ink that is employed is a typically a water-based ink that is sprayed onto the garment, is at least partially absorbed by the garment fabric, and is finally adhered to the garment fabric with a heat pressing process.

Current direct-to-garment printing processes may be employed to print designs onto light colored cotton garments without the need for any particular treatment of the garment. However, for printing onto mid-colored and dark colored cotton garments, or onto any colored garment made of a synthetic fabric or a blended fabric, printing on the garment has only been effective when chemical pre-treatment of the garment is performed, which consists of applying a chemical agent to the fabric in order to make it more receptive to the ink applied. In addition, even on light colored cotton garments, greater color intensity can typically be achieved by pre-treating the garment prior to printing. Garment pre-treatment adds additional time and expense to the direct-to-garment printing process, and involves the use of an additional chemical material, which is applied with a separate machine or by hand. It would be beneficial in the art to achieve direct-to-textile printing for garments and/or fabric without the need for chemical pre-treatment, particularly for synthetic and blended fabrics.

SUMMARY

A method of digitally printing UV-curable ink with a direct-to-textile printing system onto a textile includes positioning the textile in the direct-to-textile printing system, applying UV-curable ink to the textile with the direct-to-textile printing system according to a digital design file; and at least partially curing the UV-curable ink applied to the textile with UV light.

A direct-to-textile digital printing system includes a support media configured to receive and support a textile, at least one print head subassembly carrying at least one inkjet print head that is configured to apply UV-curable ink to the textile according to a digital design file, and at least one UV light source configured to apply UV light to the textile after UV-curable ink is applied to the textile by the at least one print head subassembly, to at least partially cure the UV-curable ink applied to the textile. At least one of the support media and the at least one print head subassembly are movable with respect to each other.

DETAILED DESCRIPTION

Herein, the terms "textile," "garment" and "fabric" (among others) are used. The term "textile" is intended to refer to a piece of cloth or woven fabric made of natural or synthetic materials, or blends thereof, whether in the form of a garment or other finished/assembled product, or in the form of an unfinished piece of material. Thus, as used herein, a "textile" could refer to a finished/assembled garment or other product, or to a piece of fabric that has not been finished/assembled.

A direct-to-textile digital printing process is disclosed which employs UV-curable ink rather than water-based ink. The process eliminates the need for pre-treatment of the textile prior to printing. Throughout this description, it should be understood that the discussion of direct printing to a textile is applicable to direct printing to any fabric configuration, with garments being a particularly popular example of an application for direct printing to a textile.

With today's water based inks, processes of printing a design directly onto a textile such as a garment vary depending on the fabric that is bring printed to. Generally speaking, it has been possible to print a design with water based ink directly to a textile that is made of white or light colored cotton or cotton blend material. However, printing onto mid to dark colored garments made of cotton or cotton blend material requires chemical pretreatment, followed by a heat press, then printing of the design onto the textile, and then another heat press. It is also difficult to apply the chemical agent for pretreatment of the textile without staining the textile, which would require an additional washing step after printing. Moreover, digitally printing onto any color of synthetic or polyester fabric has required chemical pretreatment, followed by a heat press, then printing of the design onto the garment, and then another heat press. Staining as a result of chemical pretreatment is even more difficult to avoid with fabrics of this type, and even with all of these steps, there are some synthetic fabrics that could not be printed to effectively regardless of the colors involved.

Figure 1A:
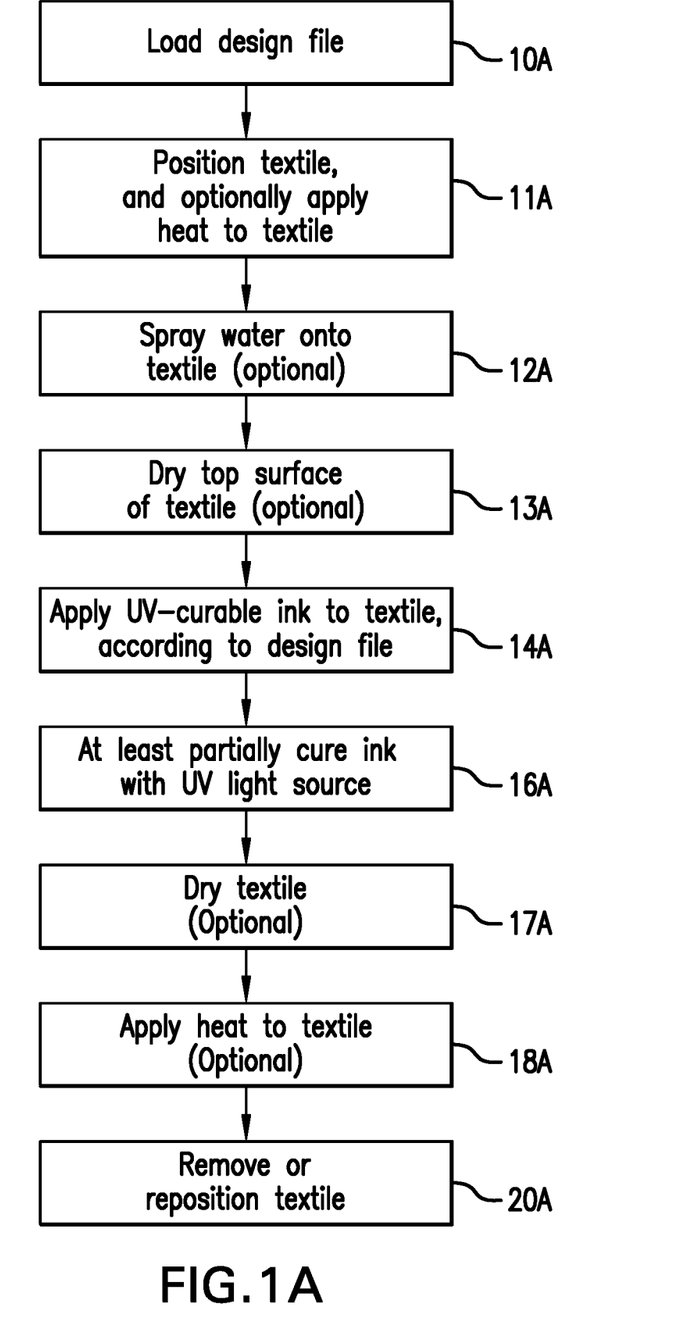
FIG. 1A is a flow diagram of an exemplary direct-to-textile digital printing process in accordance with an embodiment of the present invention.

FIG. 1A is a flow diagram of an exemplary direct-to-textile digital printing process in accordance with an embodiment of the present invention. For example, the process illustrated in FIG. 1A may be performed with a flatbed printing machine having one or more movable print heads. In the illustrated process, first, at step 10A, a digital design file is loaded or received (e.g., by a direct-to-textile printer or printing control system). This design file provides information about the design (e.g., a logo or artwork) to be printed on the textile that is used to control operation of direct-to-textile printing, such as via a print engine interface board firmware algorithm that receives the design file information and drives the positioning system(s) of the direct-to-textile printing system to control the relative positions of the textile and the print head(s) throughout the printing process. Next, at step 11A, the textile to be printed is positioned (such as on the flatbed surface of a direct-to-textile printer, for example), and heat is optionally applied to the textile prior to printing. It should be noted that the relative timing and order of steps 10A and 11A is not critical, as the both of these steps are preparatory for the actual printing of the textile. Then, the textile is optionally sprayed with water, prior to printing, such as with a spray bottle or by a mechanized process, at step 12A. In some embodiments, the textile may be sprayed with 100% distilled water. In other embodiments, some amount of a surfactant (such as about 1% in an exemplary embodiment) may be added to the water that is sprayed onto the textile. Also, a flat rigid article may be laid on top of the textile to flatten its fibers and even the distribution of the water layer across the area to be printed. This optional step is particularly useful for printing dark colors, as it improves the appearance of printed colors on those materials, without the risk of staining or the requirement of a heat press before printing, due to the use of water rather than a chemical pretreatment agent. For light or mid colored fabrics, optional step 12A of spraying the textile with water can typically by omitted. After spraying of water on the textile, the textile may optionally be pressed lightly or dried by another source to dry its top surface before printing begins, as shown at step 13A.

Next, at step 14A, UV-curable ink is applied to the textile, in accordance with the desired design indicated by the digital design file, and at step 16A, the UV-curable ink is cured by application of UV light, such as by an LED lamp in one embodiment, or by another type of light/energy source in other embodiments. In some embodiments, the application of UV-curable ink in step 14A and the curing of the ink with UV light in step 16A may be performed in one or more passes of one or more print head subassemblies that include one or more inkjet print head(s) and one or more UV light source(s) (such as an LED lamp(s) or another light/energy source) carried by the same subassembly, so that the printed ink is cured immediately after application to the textile. In other embodiments, separate structures may be used to perform these two steps, as long as curing of the UV-curable ink occurs within a time sufficient for the viscosity and/or other rheological properties of the ink to be modified so that good adhesion of the ink to the textile can occur. In addition, the application of UV-curable ink may involve an initial application of white ink before applying CMYK colored ink and/or clear ink (particularly for mid to dark colored fabrics, for example), in order to make the colors more vibrant.

After printing and curing of the UV-curable ink, the textile may optionally be dried at step 17A. For example, drying may be performed at a drying station or in a drying tunnel. Heat may also optionally be applied to the textile at step 18A. Heat may be applied in combination with pressure, such as with a heat press or heated rollers, for example, or without application of pressure, such as via a heat tunnel, an additional light and/or heat source, or even by the heat from the same UV light source(s) used to cure the UV-curable ink on the textile. In one particular example, heat pressing may be performed for about 30 seconds at about 250° F. (121° C.). The heating step can further ensure that all of the monomers of the UV-curable ink are fully cured, for certain UV-curable inks that are curable by both UV light and by heat. An exemplary ink suitable for this process is Multi-solve™ series UV ink available from Direct Color Systems of Rocky Hill, Conn. Also, in embodiments where water was sprayed on the textile (optional step 12A), this heating step will evaporate any remaining water. Finally, at step 20A, the printed textile is removed or repositioned. For example, this step may involve removing the printed textile from a direct-to-textile printer. In another example, the printed textile may be repositioned for further processing of some kind. The printing process described above may be performed to print a 9 inch by 9 inch (22.8 cm by 22.8 cm) full color logo in about 70 seconds, in one exemplary embodiment.

In some embodiments, step 16A of curing the UV-curable ink with UV light and step 18A of heat pressing the textile may be specifically configured and controlled so that the UV-curable ink applied to the textile is only partially cured at step 16A, and full curing of the UV-curable ink is completed at step 18A by application of heat (which could include further UV light application to promote full curing as well). In other embodiments, step 16A of curing the UV-curable ink with UV light may be configured and controlled to achieve complete curing of the UV-curable ink applied to the textile.

Figure 1B:
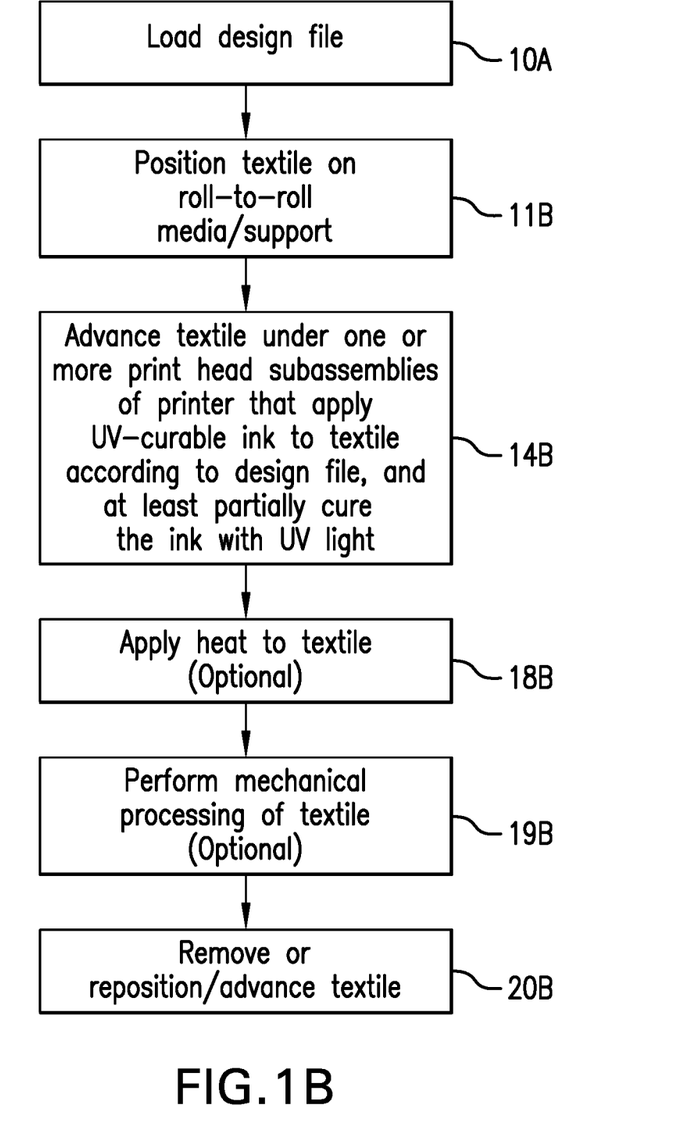
FIG. 1B is a flow diagram of an exemplary direct-to-textile digital printing process in accordance with another embodiment of the present invention.

FIG. 1B is a flow diagram of an exemplary direct-to-textile digital printing process in accordance with another embodiment of the present invention. For example, the process illustrated in FIG. 1B may be performed in a roll-to-roll system that moves the textile to be printed relative to one or more print heads. The roll-to-roll system may, in some embodiments, be part of a larger assembly line/processing system as well. In the illustrated process, first, at step 10B, a digital design file is loaded or received (e.g., by a direct-to-textile printer or printing control system). This design file provides information about the design (e.g., a logo or artwork) to be printed on the textile that is used to control operation of direct-to-textile printing, such as via a print engine interface board firmware algorithm that receives the design file information and drives the positioning system(s) of the direct-to-textile printing system to control the relative positions of the textile and the print head(s) throughout the printing process. Next, at step 11B, the textile to be printed is positioned on a roll-to-roll media/support, so that the textile is positioned to be advanced via a roll-to-roll printing process under one or more print heads. It should be noted that the relative timing and order of steps 10A and 11A is not critical, as both of these steps are preparatory for the actual printing of the textile. In some embodiments, the textile may optionally be heated and/or may optionally be sprayed with a water-containing liquid prior to printing, such as with a spray bottle or a mechanized process, as described above in step 12A of FIG. 1A, although this step is not illustrated in FIG. 1B for simplicity and clarity.

Next, at step 14B, the textile is advanced under one or more print heads subassemblies, where UV-curable ink is applied to the textile, in accordance with the desired design indicated by the digital design file, and the UV-curable ink is cured by application of UV light, such as by an LED lamp in one embodiment, or by another type of light/energy source in other embodiments. In some embodiments, the application of UV-curable ink in step 14A and the curing of the ink with UV light in step 16A may be performed in one or more passes of one or more print head subassemblies that include one or more inkjet print head(s) and one or more UV light source(s) (such as an LED lamp(s) or another light/energy source) carried by each subassembly, so that the printed ink is cured immediately after application to the textile. In other embodiments, separate structures may be used to perform these two steps, as long as curing of the UV-curable ink occurs within a time sufficient for the viscosity and/or other rheological properties of the ink to be modified so that good adhesion of the ink to the textile can occur. In addition, the application of UV-curable ink may involve an initial application of white ink before applying CMYK colored ink and/or clear ink (particularly for mid to dark colored fabrics, for example), in order to make the colors more vibrant.

After printing and curing of the UV-curable ink, the textile may optionally be dried (as generally described in step 17A of FIG. 1A, although this step is not shown in FIG. 1B for simplicity and clarity). Heat may also optionally be applied to the textile at step 18B. Heat may be applied in combination with pressure, such as with a heat press or heated rollers, for example, or without application of pressure, such as via a heat tunnel, an additional light and/or heat source, or even by the heat from the same UV light source(s) used to cure the UV-curable ink on the textile. In one particular example, heat pressing may be performed for about 30 seconds at about 250° F. (121° C.). The heating step can further ensure that all of the monomers of the UV-curable ink are fully cured, for certain UV-curable inks that are curable by both UV light and by heat, for example. Then, mechanical processing of the textile may optionally be performed at step 19B. This may involve cutting or slitting of the textile (such as for mechanically processing a garment), tensioning a take-up roll to control the pressure on the textile, or other mechanical processing steps. This step is particularly applicable to an assembly line/processing system in which the direct-to-textile printing system is one step or station in a larger textile assembly process. Finally, at step 20B, the printed textile is removed or repositioned/advanced. For example, this may involve removing the printed textile from the roll-to-roll media/support. In another example, the printed textile may be repositioned or advanced on the roll-to-roll system for further processing of some kind.

In some embodiments, curing the UV-curable ink with UV light in step 14B and step 18B of applying heat to the textile may be specifically configured and controlled so that the UV-curable ink applied to the textile is only partially cured at step 14B, and full curing of the UV-curable ink is completed at step 18B by application of heat (which could include further UV light application to promote full curing as well). In other embodiments, curing the UV-curable ink with UV light in step 14B may be configured and controlled to achieve complete curing of the UV-curable ink applied to the textile.

Figure 2:
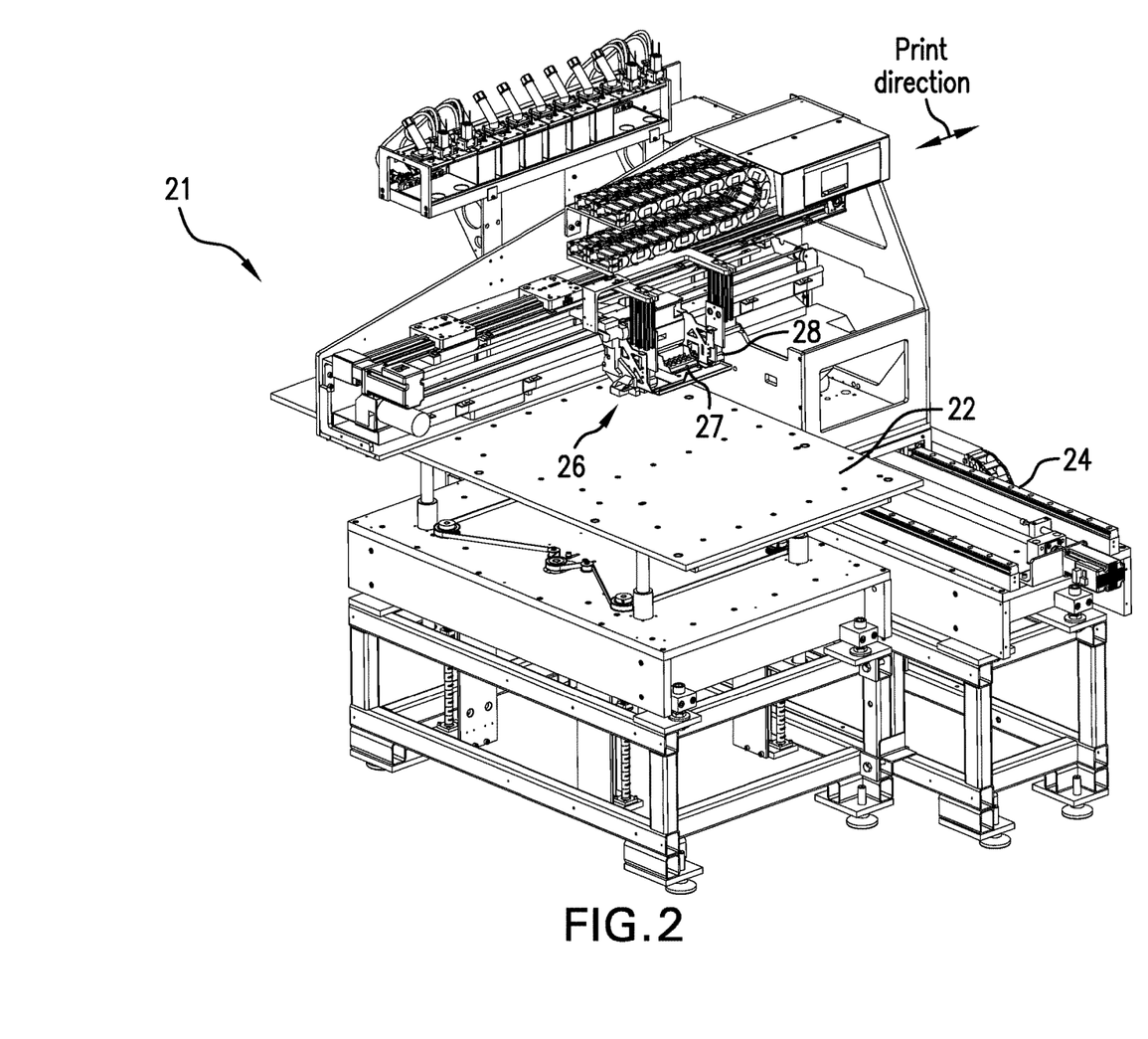
FIGS. 2 and 3 are illustrations of exemplary printing machines that may be used to perform a direct-to-textile digital printing process.

An exemplary printing machine that may be used to perform the process described above (for example, the process described in FIG. 1A) may include the 7200z Edition Printer available from Direct Color Systems of Rocky Hill, Conn., an example of which is illustrated in FIG. 2. Specifically, FIG. 2 illustrates digital printing machine 21 that includes flatbed table 22 for receiving a textile to be printed, and rails 24 configured to permit movement of table 22 perpendicular to a print direction. Printing machine 21 also includes print head subassembly 26 carrying inkjet nozzles 27 and UV light source 28, which is capable of scanning from side to side along the print direction.

Figure 3:
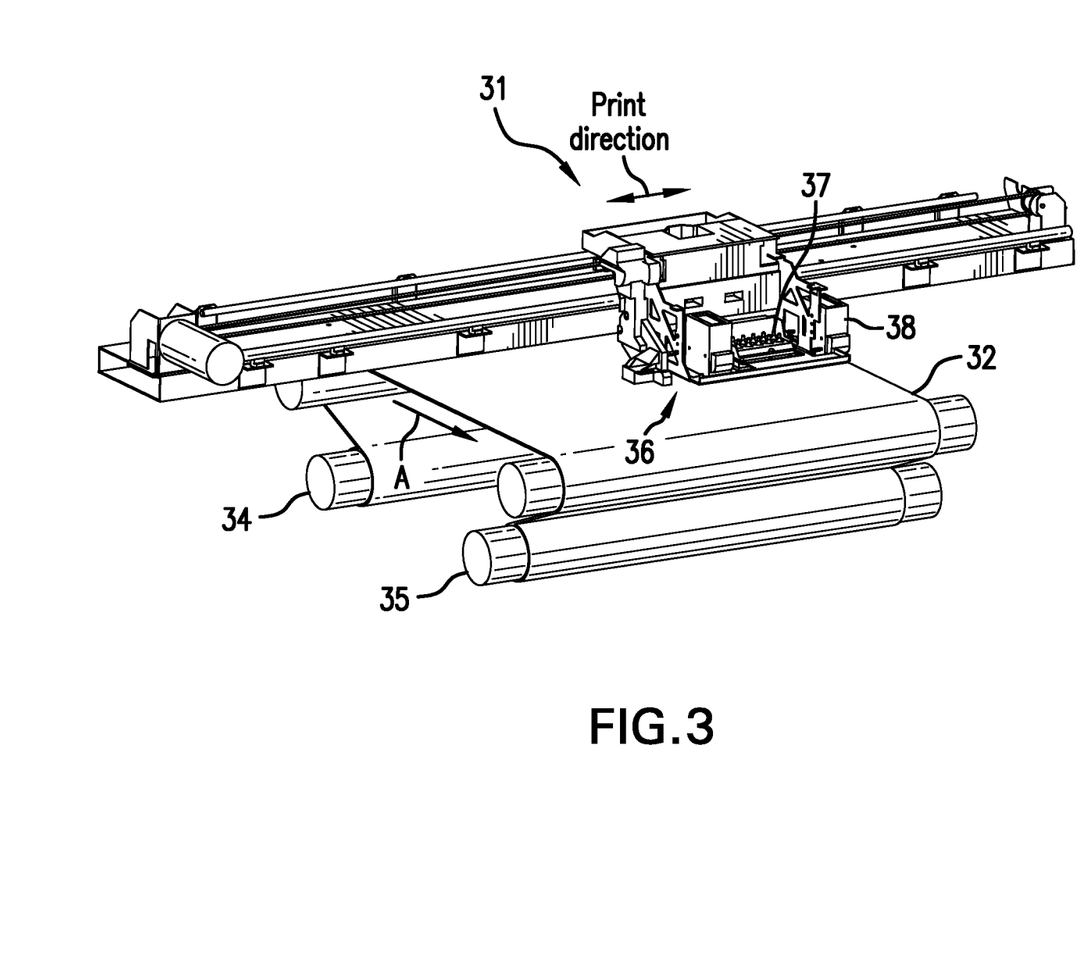

FIG. 3 illustrates another exemplary printing machine that may be used to perform the process described above (for example, the process described in FIG. 1B). Specifically, FIG. 3 illustrates digital printing machine 31 that includes roll-to-roll media 32 for supporting and advancing a textile to be printed, and media roller 34 and takeup roller 35 that are operable to advance media 32 in the direction of arrow A, perpendicular to a print direction. Printing machine 31 also includes print head subassembly 36 carrying inkjet nozzles 37 and UV light source 38, which is capable of scanning from side to side along the print direction. In other embodiments, print head subassembly 36 may include inkjet nozzles 37 and UV light source(s) 38 that cover the entire width of the printing area on roll-to-roll media 32, so that print head subassembly 36 may be stationary.

In both printing machine 21 (FIG. 2) and printing machine 31 (FIG. 3), print head subassembly 26/36 may include a single print head or a plurality of print heads that are ganged together, in various embodiments, with a plurality of inkjet nozzles 27/37 being carried by the print head(s). UV light source 28/38, which may be one or more LED lamps in exemplary embodiments, or may be another type of light/energy source in other embodiments, is used to cure UV-curable ink dispensed from the inkjet nozzles of the print head subassembly, which are located in the print direction from UV light source 28/38. In one particular example, an LED lamp assembly is employed that emits 395 nm wavelength light with irradiance of 6 Watts per square centimeter ($W/cm^2$). Other parameters or lamps for UV light source 28/38 may be selected for other embodiments and for particular applications.

Inkjet nozzles 27/37 may extend across substantially the entire width of print head subassembly 26/36. Print head subassembly 26/36 may include a large number of inkjet nozzles in various embodiments, and either a single print head or multiple print heads. In some embodiments, optional reflectors may be employed to focus the UV light produced by UV light source 28/38 onto a concentrated region of ink to be cured that has been dispensed by inkjet nozzles 27/37.

Inkjet nozzles 27/37 of print head subassembly 26/36 can be digital ink dispensers, such as, for example, piezoelectric ("piezo") dispensers such as micro piezo dispensers in some embodiments, thermal inkjet (TB) dispensers, or others. Piezo technology is based on the phenomenon of piezoelectricity where materials like crystals and ceramics (known as "piezoelectric materials") react physically by bending, vibrating or expanding when an electrical charge is applied to them. Piezo print heads feature small piezoelectric actuators that are built behind the print nozzles. When an electrical charge is applied to them, the piezoelectric elements bend backward, drawing precise amounts of ink from the ink chamber into the firing chamber. When the electrical pulse is reversed, the piezoelectric elements bend the opposite way very rapidly, propelling the ink out of the nozzles at high speed. Piezo technology is able to precisely eject ink droplets of up to five different sizes by controlling minute variations in the charge applied to the piezoelectric actuators of the print heads.

The UV curing process and various other control features necessary for digital printing operation, including the control of registration repeatability, can be controlled. For example, the print engine control system may consist of a standard photo quality printer control system and components capable of resolutions ranging from 360 DPI up to 5760 DPI. Printing machine 21/31 may dispense a single layer or multiple layers of ink onto garments being printed, in various embodiments.

In some embodiments, such as in the embodiments shown in FIGS. 2 and 3, print head subassembly 26/36 can be configured to print "inline." Inline printing may involve first printing out a base color layer from inkjet nozzles that are arranged furthest in the print direction. A second set of inkjet nozzles that are arranged further back in the following direction (opposite the print direction) can then print another color layer of UV-curable ink on the base color layer. All of the dispensed ink can then be cured as UV light source 28/38 passes over the regions that were just printed to. This process can be completed in a single pass. A second pass or even further passes of print head subassembly 26/36 may be used to add additional colors or features.

In printing machines 21 and 31, print head subassembly 26/36 is movable relative to the rest of printing machine 21/31 both away from table 22/media 32 and across table 22/media 32 (i.e., in the print direction). Because both table 22/media 32 and print head subassembly 26/36 are movable relative to the rest of printing machine 21/31, printing machine 21/31 can be controlled to modify the position of table 22 and advance the media 32, and also to modify the height of print head subassembly 26 from table 22.

In an alternative configuration of printing machine 21 shown in FIG. 2, print head subassembly 26 may be kept completely stationary, and table 22 may be moved multi-dimensionally instead. In various embodiments, movement of one, the other, or both of print head subassembly 26 and table 22 are possible, so long as there is relative movement of print head subassembly 26 to table 22 that permits for dispensing and curing UV ink in a satisfactorily precise manner.

A detailed description of many of the basic functions (such as print head subassembly positioning and flatbed table positioning, and raster image processing of design files, for example) of a printing machine like printing machine 21 shown in FIG. 2 is provided in U.S. application Ser. No. 14/780,346 filed on Sep. 25, 2015. The disclosure of U.S. application Ser. No. 14/780,346 relating to these basic printing machine functions is hereby incorporated by reference.

Figure 4A:
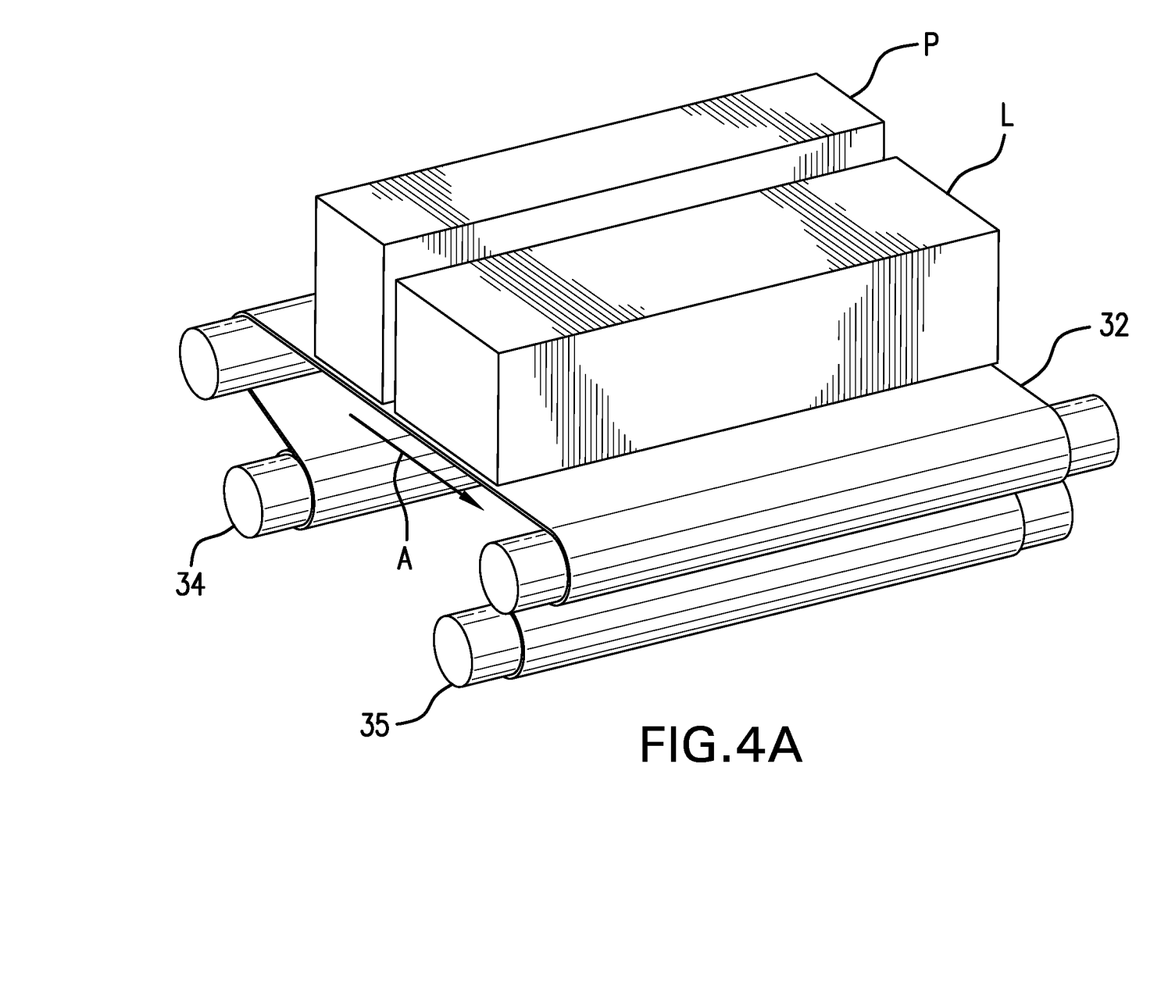
FIG. 4A is a diagram of a print head subassembly configuration in a roll-to-roll printing machine configured for single pass operation with a stationary or scanning print head and UV light source.

FIG. 4A is a diagram of a print head subassembly configuration in a roll-to-roll printing machine configured for single pass operation with a print head and UV light source. As illustrated in FIG. 4A, roll-to-roll media 32 is provided for supporting and advancing a textile to be printed, and media roller 34 and takeup roller are operable to advance media 32 in the direction of arrow A. Print head P and UV light source L are provided, so that UV-curable ink may be applied by print head P and at least partially cured by UV light source L in a single pass as a textile supported by media 32 passes under print head P and UV light source L in the direction of arrow A. In the embodiment shown, print head P and UV light source L are stationary and are sufficiently wide to cover the entire width of the textile supported on roll-to-roll media 32 as it passes by. However, in other embodiments, print head P and/or UV light source L may be capable of scanning from side to side, perpendicular to arrow A, to cover the entire width of the textile supported on roll-to-roll media 32 as it passes by.

Figure 4B:
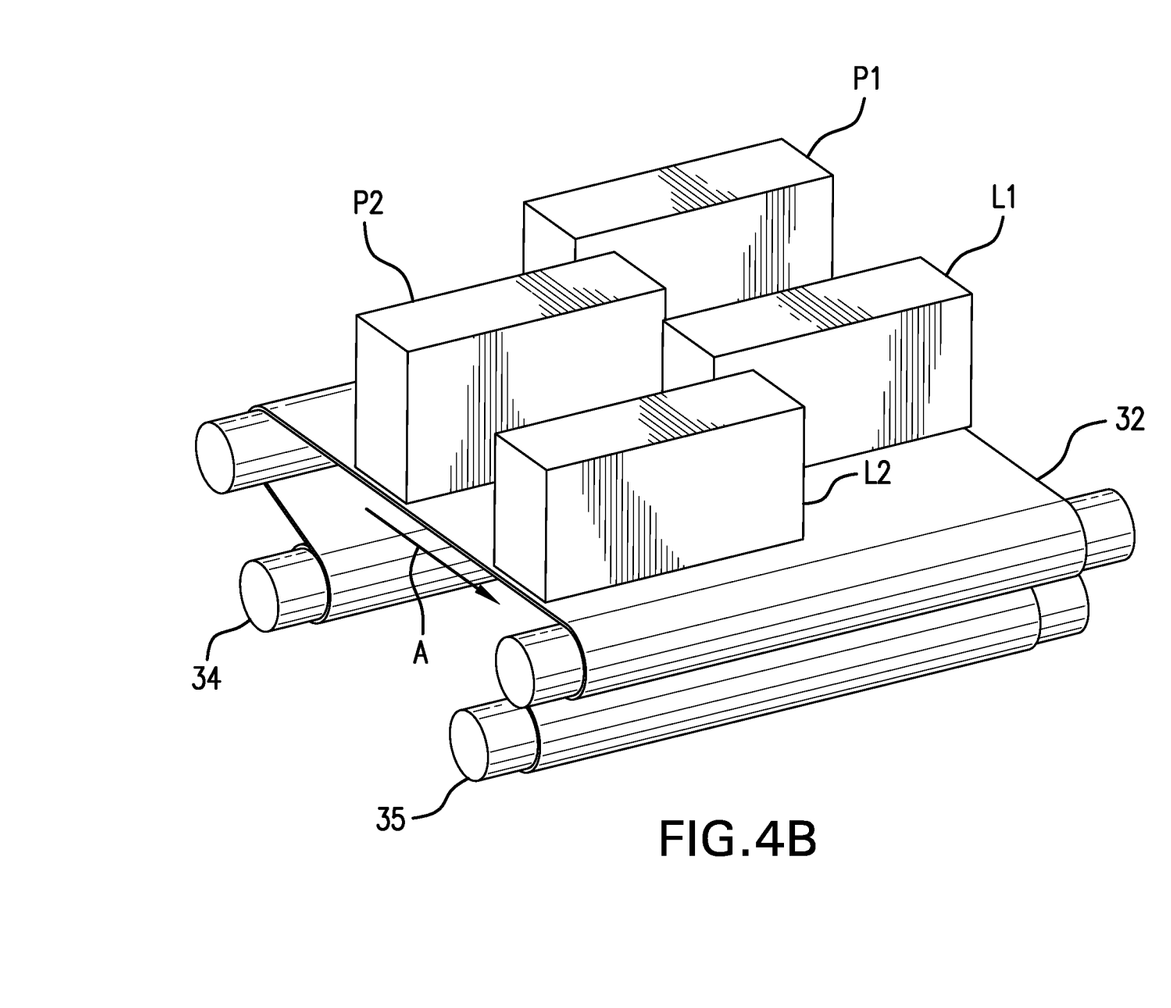
FIG. 4B is a diagram of a print head subassembly configuration in a roll-to-roll printing machine configured for single pass operation with multiple stationary or scanning print heads and UV light sources.

FIG. 4B is a diagram of a print head subassembly configuration in a roll-to-roll printing machine configured for single pass operation with multiple print heads and UV light sources. As illustrated in FIG. 4B, roll-to-roll media 32 is provided for supporting and advancing a textile to be printed, and media roller 34 and takeup roller are operable to advance media 32 in the direction of arrow A. In the configuration shown in FIG. 4B, two print heads P1 and P2 and UV light sources L1 and L2 are provided, so that UV-curable ink may be applied by print heads P1 and P2 and at least partially cured by UV light sources L1 and L2 in a single pass as a textile supported by media 32 passes under print heads P1 and P2 and UV light sources L1 and L2 in the direction of arrow A. In other embodiments, more than two print heads and/or UV light sources could be used. In the configuration shown in FIG. 4B, print heads P1 and P2 and UV light sources L1 and L2 are stationary and together are sufficiently wide to cover the entire width of the textile supported on roll-to-roll media 32 as it passes by. However, in other embodiments, print heads P1 and P2 and/or UV light sources L1 and L2 may be capable of scanning from side to side, perpendicular to arrow A, to cover the entire width of the textile supported on roll-to-roll media 32 as it passes by.

Figure 5:
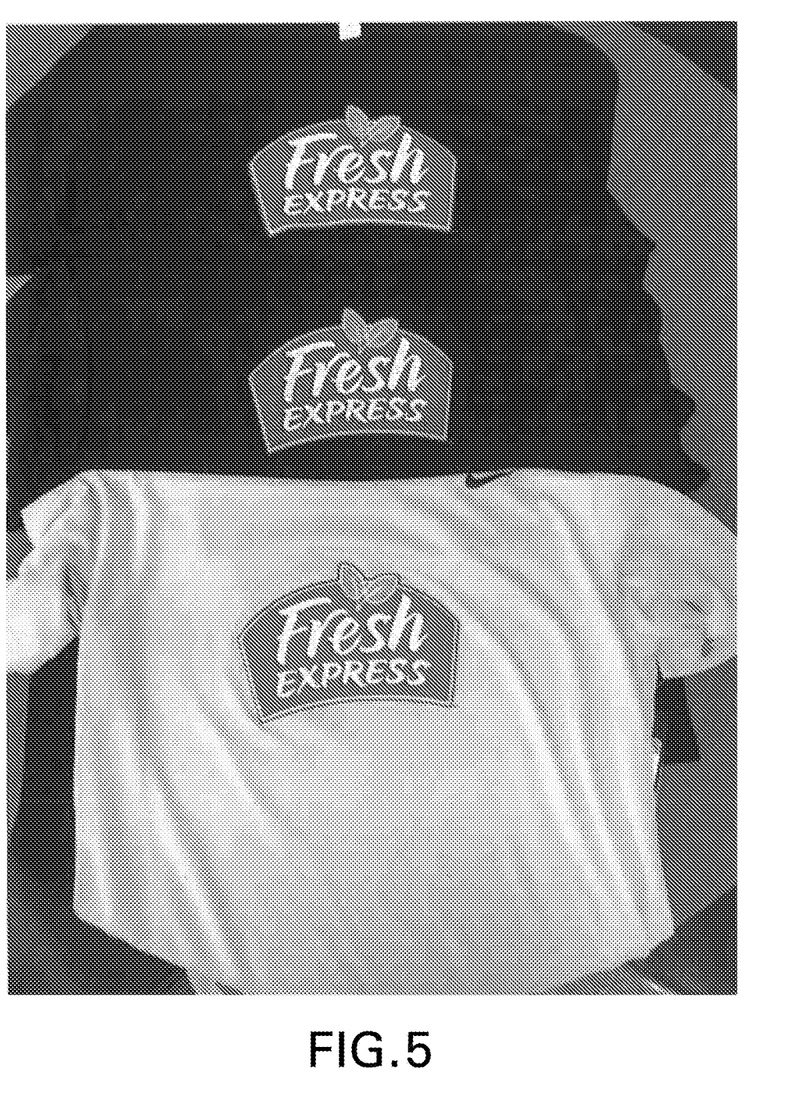
FIG. 5 is a photograph illustrating shirts printed with the direct-to-textile digital printing process described herein.

By employing the direct-to-textile printing process described herein, applying UV-curable ink and curing the applied ink with a UV light source, textiles made of synthetic fabric, blended fabric and cotton may all be printed in their natural state, without undergoing pre-treatment by a chemical agent, which had previously been required (particularly for synthetic fabric and blended fabric, and dark-colored cotton fabric) in order for the ink to bond sufficiently to the textile. As a result, durable and resistant prints can be achieved without any pre-treatment of the textiles, and the printed image is able to stretch with the fabric of the textiles. FIG. 5 illustrates the printing quality that can be achieved by the direct-to-textile digital printing process described herein, without pretreatment of the fabric, for a dark cotton shirt (top), a dark polyester shirt (middle), and a light colored Nike Dri-Fit shirt (bottom). These materials and colors could not be printed in a direct-to-textile process using conventional water-based inks without chemical pretreatment.

While the direct-to-textile printing process described above has been explained as not requiring pre-treatment with a chemical agent, it should be understood that the UV-curable ink described herein could be used in some embodiments with a chemically pre-treated fabric. While such pre-treatment is not necessary in most embodiments in order to achieve high quality printing with good adhesion of the ink to the textile fabric, there may be some situations in which a pre-treatment may be performed, and the direct-to-textile printing process described herein using UV-curable ink may be employed in those scenarios in order to provide improved print quality and ink adhesion for a variety of fabrics and applications.

In the description above, reference has been made to challenges associated with printing onto "dark" colored textiles or fabrics. In at least some of the embodiments herein, a "dark" colored textile or fabric is defined as a textile in which, when the color in the artwork defined in the design file used to control printing is converted to the HSL (Hue-Saturation-Lightness) Color Cylinder space, and is then subsequently printed onto the textile, the color measured on the textile has a Lightness ("L") value that has decreased by 2.5% or more from the L value of the color defined in the design file. In such a case, in some of the embodiments described above, white ink is printed under the image prior to printing the colors as defined in the design file, thereby assuring that the correct color is being printed onto the textile and the colors are not darker than they are intended to be as defined by the artwork in the design file.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope and concepts of this description.

The invention claimed is:

1. A method of digitally printing UV-curable ink with a direct-to-textile printing system onto a textile that has not been pretreated with any chemical pretreatment, the method comprising:
   positioning the textile in the direct-to-textile printing system;
   applying UV-curable ink to the textile with the direct-to-textile printing system according to a digital design file;
   at least partially curing the UV-curable ink applied to the textile with UV light; and
   between the steps of positioning the textile on the direct-to-textile printing system and applying UV-curable ink to the textile with the direct-to-textile printing system according to the digital design file, spraying a liquid that consists of distilled water or consists of distilled water and up to 1% of a surfactant on the textile.

2. The method of claim 1, wherein the textile comprises a synthetic fabric.

3. The method of claim 1, further comprising, after the step of curing the UV-curable ink applied to the textile with UV light, applying heat to the textile.

4. The method of claim 3, wherein applying heat to the textile comprises heat pressing the textile for about 30 seconds at about 250° F. (121° C.).

5. The method of claim 3, wherein the UV-curable ink is partially cured with the UV light, and is fully cured by applying heat to the textile.

6. The method of claim 1, wherein the UV-curable ink is partially cured with the UV light, and is fully cured by subsequently applying additional UV light to the textile.

7. The method of claim 1, wherein at least partially curing the UV-curable ink applied to the textile with UV light comprises completely curing the UV-curable ink with the UV light.

8. The method of claim 1, wherein at least partially curing the UV-curable ink applied to the textile with UV light comprises application of UV light by at least one LED light source.

9. The method of claim 1, wherein applying UV-curable ink to the textile with the direct-to-textile printing system and at least partially curing the UV-curable ink applied to the textile with UV light are performed in at least one pass of a print head subassembly that carries at least one inkjet print head and at least one UV light source, such that UV-curable ink is applied to the textile by the at least one inkjet print head and is at least partially cured immediately after application to the textile by the at least one UV light source.

10. The method of claim 1, wherein applying UV-curable ink to the textile with the direct-to-textile printing system and at least partially curing the UV-curable ink applied to the textile with UV light are performed by advancing the textile on a roll-to-roll media adjacent to at least one print head subassembly that carries at least one inkjet print head and at least one UV light source, such that UV-curable ink is applied to the textile by the at least one inkjet print head and is at least partially cured immediately after application to the textile by the at least one UV light source.

11. The method of claim 1, wherein applying UV-curable ink to the textile with the direct-to-textile printing system according to the digital design file comprises:
   applying at least one layer of white ink on the textile; and
   applying colored ink and/or clear ink on the at least one layer of white ink on the textile.

12. The method of claim 11, wherein the textile is a dark colored textile.

13. A direct-to-textile digital printing system comprising:
   a support media configured to receive and support a textile that has not been pretreated with any chemical pretreatment;
   at least one print head subassembly carrying at least one inkjet print head that is configured to apply UV-curable ink to the textile according to a digital design file;
   at least one UV light source configured to apply UV light to the textile after UV-curable ink is applied to the textile by the at least one print head subassembly, to at least partially cure the UV-curable ink applied to the textile; and
   a spraying apparatus configured to spray a liquid that consists of distilled water or consists of distilled water and up to 1% of a surfactant on the textile prior to application of UV-curable ink to the textile,
   wherein at least one of the support media and the at least one print head subassembly are movable with respect to each other.

14. The direct-to-textile printing system of claim 13, wherein the support media comprises a roll-to-roll system configured to move the textile.

15. The direct-to-textile printing system of claim 14, wherein the direct-to-textile printing system is a part of a larger textile processing system.

16. The direct-to-textile printing system of claim 13, wherein the support media comprises a flatbed of a direct-to-textile printer.

* * * * *